Oct. 20, 1953  S. N. POLIS  2,655,756
FISHING TACKLE
Filed April 22, 1949
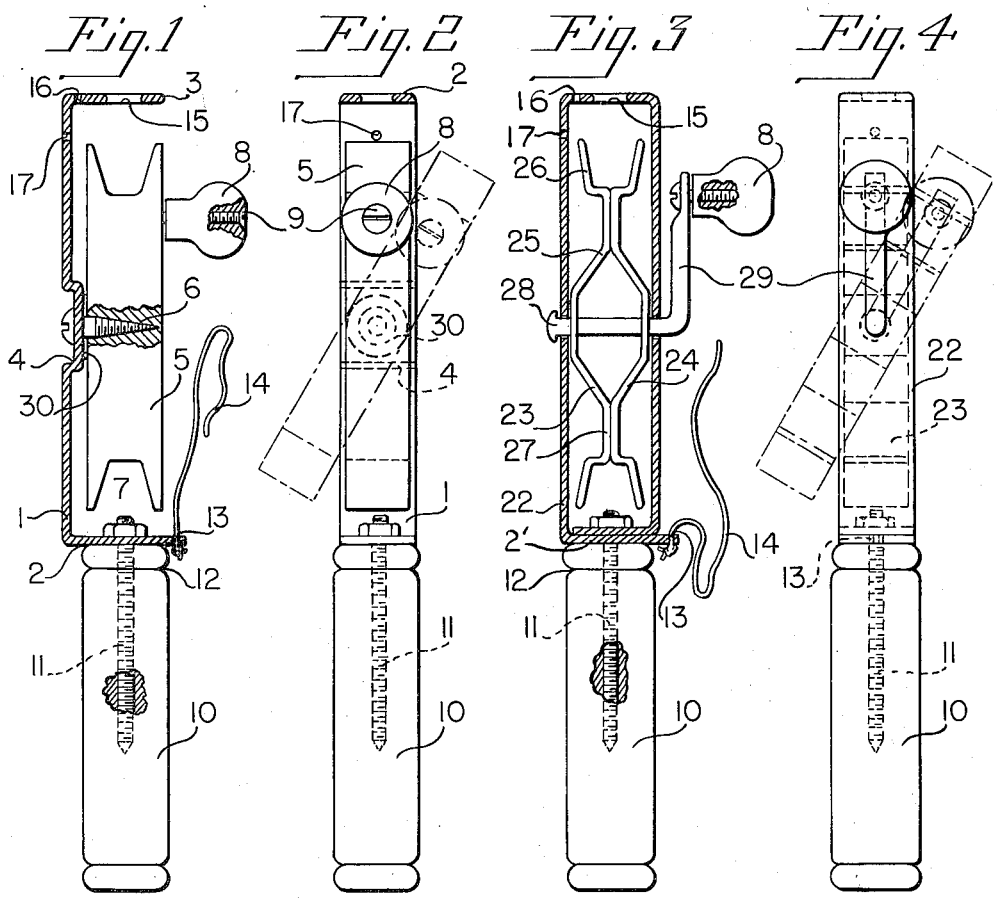
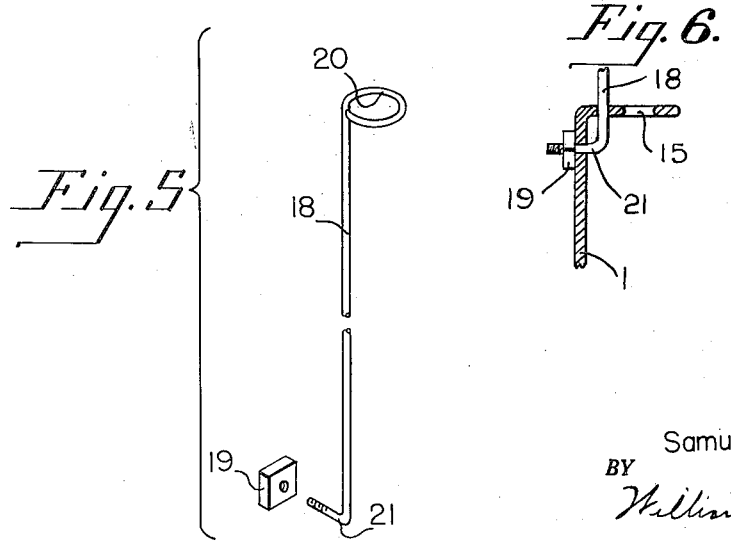
INVENTOR.
Samuel N. Polis
BY
William F. Nickel
ATTORNEY Patented Oct. 20, 1953

2,655,756

UNITED STATES PATENT OFFICE 2,655,756

FISHING TACKLE

Samuel N. Polis, Brooklyn, N. Y.

Application April 22, 1949, Serial No. 89,064

3 Claims. (Cl. 43—20)

This invention is an improvement in fishing tackle; particularly a device of the kind mentioned adapted to facilitate the taking of fish with a hand line and having a reel by which the line can easily be managed.

An object of the invention is to provide tackle comprising a suitable support or mount for a reel of special design, and a handle attached thereto for casting and holding; together with suitable means for preventing rotation of the reel except when the line is being taken in or paid out, or at any other time when movement should be permitted.

A further object is to provide fishing tackle comprising a frame member which carries the reel, and a handle securely affixed to the frame, in proper alignment with the reel; the latter of course being pivotally connected to the frame.

These and other objects are made clear in the following description, and the novel features are defined in the claims. But, while the drawings illustrate a preferred embodiment of the invention, variations in structural details may be adopted without deviation from the general construction in which the invention resides.

On the drawings:

Figure 1 is a side view of one form of the invention.

Figure 2 is an elevation of the device shown in Figure 1, seen from the right.

Figure 3 is a side view of another form of the device.

Figure 4 is an elevation of what appears on Figure 3, seen from the right thereof;

Figure 5 presents a detail, and

Figure 6 indicates how an extension can be affixed to the handle when desired.

In the device illustrated upon Figures 1 and 2, the numeral 1 indicates a mounting frame for the reel, this frame or member being preferably fashioned out of a strip of suitable metal, with the ends bent transversely at right angles as shown at 2 and 3. The middle of this frame is offset in the same direction as the ends to make an abutment or projection 4 which serves as a bearing surface for the reel 5. A pivot screw 6 is forced into the center of the reel, and it passes through a bearing aperture in the offset 4. This screw has a smooth surface near the head on the outside of the frame, and this smooth surface enables the reel when turned to revolve the screw freely in the offset 4. The reel is rectangular or elongated as illustrated in Figure 2, with notches 7 in both ends for the cord or line. It therefore has the shape of a bobbin, and bears a knob secured on the side thereof farthest from the offset 4 by means of a screw 9, on which the knob can turn.

The one end 2 is affixed to a handle 10 by means of a long screw 11; the handle 10 and member 1 constituting the body of the device. The handle has a groove 12 adjacent each end, and the bent extremity 2 of the frame has a projection with an aperture 13, for a cord 14, having its end passed through the aperture and tied securely. To hold the reel against turning when the reel is to be kept motionless, the end of the cord is wrapped around the screw 9 in the space between the knob 8 and the reel 5, the screw 9 being long enough so that the knob 8 is not held in direct contact with the reel 5. The opposite extremity 3 of the frame has an aperture 13 which is a guide eyelet for the line wound upon the reel 5.

The axis of the handle and the central plane between the faces of the reel passing through the notches 7 are in line, and so is the center of the eyelet 15. When the appliance is to be used for casting or dropping the line, the cord 14 is unfastened, and the reel is allowed to turn, but its rotation is controlled by the fisherman's finger. One hand is enough, but to wind the cord upon the reel, one hand grasps the handle 10 and the other the knob 8.

The bent-outer end 3 also has an opening or eyelet 16 near the angle of the bend and another aperture 17 near the eyelet or aperture 16. This aperture 16 is elongated a bit towards the eyelet 15. The apertures 16 and 17 can receive the end of a short elastic extension or rod 18 having an elbow 21 at one extremity and an eyelet or loop 20 at the other. The elbow is passed through the aperture 16, and then through aperture 17, being threaded to receive a nut 19 by which the rod is secured and made fast. When the extension 18 is used, the line can run through the eyelet 15 and the eyelet 20. The nut 19 can be a wing nut so that it can be more easily screwed on and off, thus making it more convenient to easily attach or detach the extension by hand than with a standard nut.

In Figures 3 and 4, the frame 22 is also made of a bent piece of metal, the extremities of which overlap to make the end 2', which is affixed by the bolt 11 to the handle 10. This frame has the shape of a rectangle enclosing the reel 23. This reel consists of two halves or sections 24, each of bent or stamped metal, fastened together by riveting or welding or by other means. At the center, each section bulges outward to make a hub 25, and the ends of the sections are separated to form notches 26. The two sections are attached to each other between the hub and the notches as indicated at 27. Through the center of the hub passes a shaft 28, rigid with the reel, and mounted in bearings in the opposite sides of the frame. One end of this shaft projects out of the frame 22 and is bent at right angles, as indicated at 29; and on the end thereof is the knob 8. The aperture 15 in the outer end of the frame again serves as an eyelet for the cord, and the outer end may also have the apertures 16 and 17 for the rod extension 18 as before. The frame at the handle has a perforated projection 13 as before for wrapping a cord about the knob when the knob is to be stationary. Washers 30 may be employed to prevent wear on the reels 5 and 23.

The tackle can therefore be made up as a strong, compact and handy unit, and serves very well for the intended purpose.

The shape of the handle 10, frames 1 and 22 and hub 23 and other parts, can of course be changed somewhat, and will be made of any suitable materials. The grooves 12 in the handle 1 can be discarded because they are not essential. The cord 14 can be tied to the handle 10 if desired and the apertured part 13 omitted. When the cord 14 is used, the knob 8 is pulled close to the handle 10. The washers 30, prevent wear on the reel and frames carrying them.

Other ways of attaching the extension 18 to the frames 1 and 22 may also be employed and alterations made in the extension and the frames may be made for this purpose. The entire article will be small enough to make a package that can be carried in the owner's pocket, if the total length of the removable extension is made substantially that of the assembled device as shown in Figures 1, 2, 3 and 4.

It is to be noted that keeping the axis of handle and the plane of the reel and eyelet in substantial alignment relieves much of the strain on the hand holding the device when fishing.

Of course the removable extension 18 may be made telescopic, or of fitting sections, or folding sections, should it be desirable to have longer or shorter rods than substantially the length of the assembled device as shown in Figures 1, 2, 3 and 4. The parts of the device comprising the handle, the extension, and the frame with its attached reel, are of such size that they can easily be fitted side by side into a container which can easily be inserted into a small space such as a woman's handbag or the owner's pocket. It will be noted that the handle, the rod and the frame can be easily assembled or disassembled by hand without the use of tools, as it is not necessary to have nut 19 drawn up tight to effectively attach the extension to the frame.

Also, the friction of revolving parts can be greatly reduced by ball bearings in more expensive forms of the invention.

Having described my invention, what I believe to be new is:

1. A fishing device comprising a frame having an elongated side, and end portions shorter than the side, integral with, and at substantially right angles to said side, a reel rotatably mounted on said side between said end portions, a knob for rotating the reel, a handle detachably affixed to one end portion of the frame, the other end portion of the frame having eyelets, a part of the side adjacent the other end having an aperture, a wire extension having an end with a bend adapted to be passed through one of said eyelets and said aperture, and the end of the extension near the bend being secured to the frame, and means carried by said device to hold the reel from rotating, said extension having a loop at the other end substantially perpendicular to the longitudinal axis of the extension.

2. A fishing device comprising a frame having an elongated side, and end portions shorter than the side, integral with, and at substantially right angles to said side, a reel rotatably mounted on said side between said end portions, a knob for rotating the reel, a handle detachably affixed to one end portion of the frame, the other end portion of the frame having eyelets, a part of the side adjacent the other end having and aperture, a wire extension having an end with a bend adapted to be passed through one of said eyelets and said aperture, and the end of the extension near the bend being secured to the frame, and means carried by said device to hold the reel from rotating, said extension having a loop at the other end substantially perpendicular to the longitudinal axis of the extension, said frame being made of a strip of material, with its extremities bent to form said end portions, said frame being open on one side thereof and the reel being mounted adjacent the middle of the strip.

3. A fishing device comprising a frame having an elongated side, and end portions shorter than the side, integral with, and at substantially right angles to said side, a reel rotatably mounted on said side between said end portions, a knob for rotating the reel, a handle detachably affixed to one end portion of the frame, the other end portion of the frame having eyelets, a part of the side adjacent the other end having an aperture, a wire extension having an end with a bend adapted to be passed through one of said eyelets and said aperture, and the end of the extension near the bend being secured to the frame, and means carried by said device to hold the reel from rotating, said extension having a loop at the other end substantially perpendicular to the longitudinal axis of the extension, said frame being made of a strip of material bent to form said end portions and having an additional side connecting said ends, the reel being mounted between said sides.

SAMUEL N. POLIS.

References Cited in the file of this patent

UNITED STATES PATENTS

| Number | Name | Date |
|---|---|---|
| D. 59,204 | Dunkelberger | Oct. 4, 1921 |
| 664,786 | Setchell | Dec. 25, 1900 |
| 999,641 | Fuerst | Aug. 1, 1911 |
| 1,225,663 | Leigh | May 8, 1917 |
| 1,572,104 | Budd | Feb. 9, 1926 |
| 1,605,710 | Ford | Nov. 2, 1926 |
| 1,625,988 | Dice | Apr. 26, 1927 |
| 1,827,488 | Roach | Oct. 13, 1931 |
| 1,994,171 | Denison | Mar. 12, 1935 |

FOREIGN PATENTS

| Number | Country | Date |
|---|---|---|
| 873 | Great Britain | of 1912 |